US011294987B2

(12) United States Patent
Ziring

(10) Patent No.: US 11,294,987 B2
(45) Date of Patent: Apr. 5, 2022

(54) TARGETED CONTENT DISTRIBUTION OVER A NETWORK

(71) Applicant: Comcast Cable Communications, LLC, Philadelphia, PA (US)

(72) Inventor: Stephen Ziring, Lansdale, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 1510 days.

(21) Appl. No.: 15/033,789

(22) PCT Filed: Oct. 31, 2014

(86) PCT No.: PCT/US2014/063512
§ 371 (c)(1),
(2) Date: May 2, 2016

(87) PCT Pub. No.: WO2015/066519
PCT Pub. Date: May 7, 2015

(65) Prior Publication Data
US 2016/0283700 A1  Sep. 29, 2016

Related U.S. Application Data

(60) Provisional application No. 61/898,262, filed on Oct. 31, 2013.

(51) Int. Cl.
G06Q 30/02 (2012.01)
G06F 21/10 (2013.01)
(Continued)

(52) U.S. Cl.
CPC .......... *G06F 21/10* (2013.01); *G06F 21/6218* (2013.01); *G06Q 30/02* (2013.01);
(Continued)

(58) Field of Classification Search
CPC ..... G06F 21/10; G06F 21/6218; G06Q 30/02; G06Q 30/0269; H04L 63/08; H04L 67/02;
(Continued)

(56) References Cited

U.S. PATENT DOCUMENTS 5,933,811 A  8/1999 Angles et al.
7,680,883 B2  3/2010 Reshef et al.
(Continued)

OTHER PUBLICATIONS

International Preliminary Report on Patentability—PCT/US2014/063512—dated May 12, 2016.
(Continued)

*Primary Examiner* — Kambiz Abdi
*Assistant Examiner* — Breffni Baggot
(74) *Attorney, Agent, or Firm* — Banner & Witcoff, Ltd.

(57) ABSTRACT

A computing device may be configured to provide authorization to a first content source to provide first content to a user device. The computing device may receive a request from the first content source to identify a location of second content to be presented to the user device and respond to the request by providing an address to the first content source. At the provided address, a request for the second content from the user device may be received. When responding to the request, the computing device may retrieve information associated with the user (e.g., user preference information) from the user device. Using this information, the computing device may generate at least one parameter for selecting the second content and send a response to the user device. The response may include an address for the second content and the at least one parameter for selecting the second content.

32 Claims, 6 Drawing Sheets

(51) Int. Cl.
*H04N 21/475* (2011.01)
*H04N 21/81* (2011.01)
*H04N 21/2668* (2011.01)
*H04N 21/858* (2011.01)
*H04N 21/258* (2011.01)
*G06F 21/62* (2013.01)
*H04L 29/06* (2006.01)
*H04L 67/02* (2022.01)

(52) U.S. Cl.
CPC ......... *G06Q 30/0269* (2013.01); *H04L 63/08* (2013.01); *H04L 67/02* (2013.01); *H04N 21/25866* (2013.01); *H04N 21/2668* (2013.01); *H04N 21/4751* (2013.01); *H04N 21/812* (2013.01); *H04N 21/8586* (2013.01)

(58) Field of Classification Search
CPC ......... H04N 21/25866; H04N 21/2668; H04N 21/4751; H04N 21/812; H04N 21/8586
See application file for complete search history.

(56) References Cited

U.S. PATENT DOCUMENTS

| | | | | |
|---|---|---|---|---|
| 7,840,645 | B1* | 11/2010 | Chase | H04L 67/2814 709/217 |
| 8,639,572 | B1* | 1/2014 | Barnes | G06Q 30/0241 705/14.4 |
| 2002/0010626 | A1* | 1/2002 | Agmoni | G06F 3/0481 705/14.58 |
| 2002/0023010 | A1 | 2/2002 | Rittmaster et al. | |
| 2009/0234732 | A1 | 9/2009 | Zorman et al. | |
| 2012/0008786 | A1* | 1/2012 | Cronk | H04L 9/30 380/282 |
| 2012/0017240 | A1 | 1/2012 | Shkedi | |
| 2012/0072272 | A1 | 3/2012 | Kilar et al. | |
| 2013/0080268 | A1* | 3/2013 | Gordon | G06F 16/41 705/14.73 |
| 2013/0198328 | A1 | 8/2013 | Green et al. | |
| 2014/0020017 | A1* | 1/2014 | Stern | H04N 21/2668 725/34 |
| 2018/0227646 | A9* | 8/2018 | Navin | H04N 21/812 |

OTHER PUBLICATIONS

International Search Report and Written Opinion—PCT/US2014/063512—dated Jan. 26, 2015.
European Search Report—EP App. 14857222.5—dated May 8, 2017.
Jun. 22, 2018—European Office Action—EP 14857222.5.
Dec. 7, 2020—Canadian Office Action—CA 2929463.
2020 Oct.2020, European Office Action, EP 14857222.5.

* cited by examiner

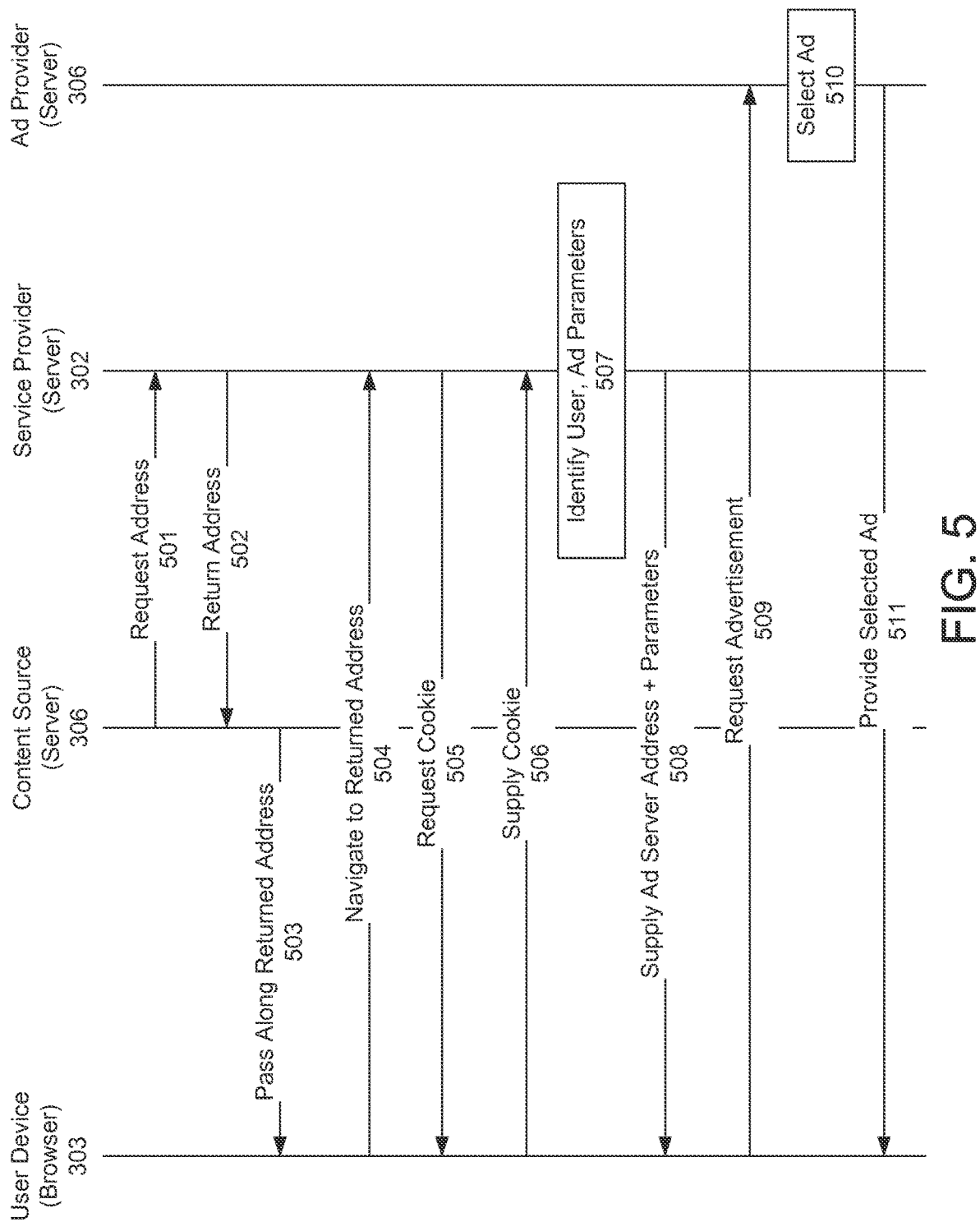

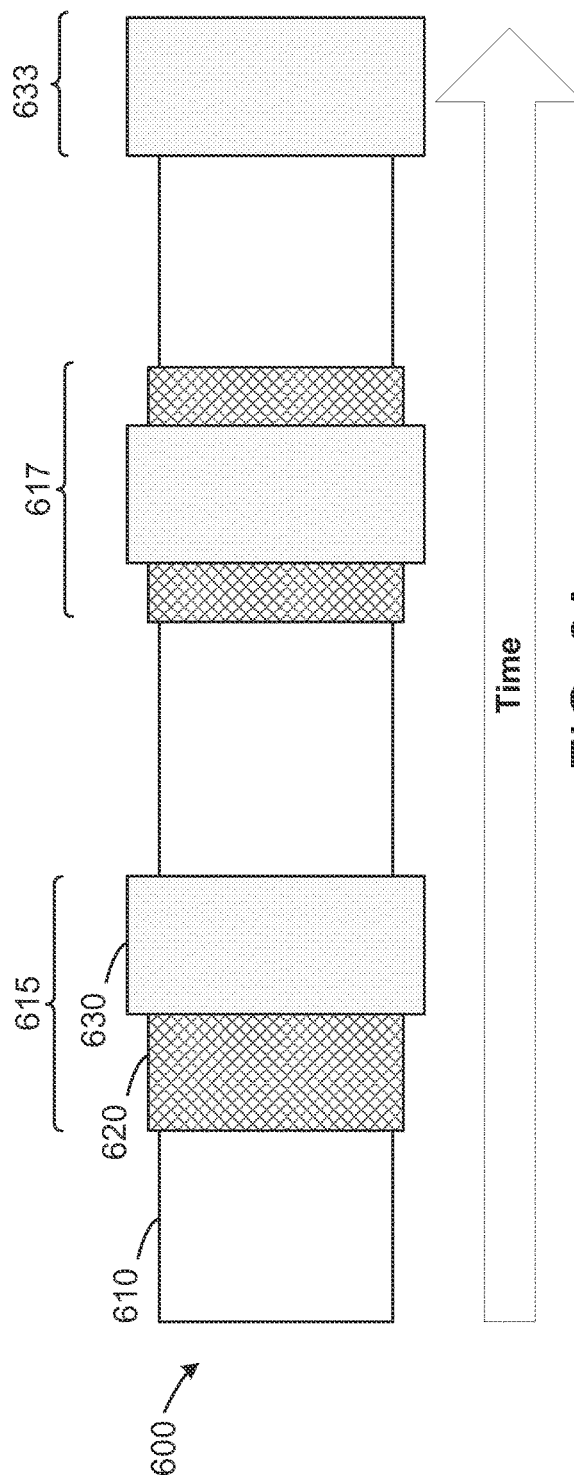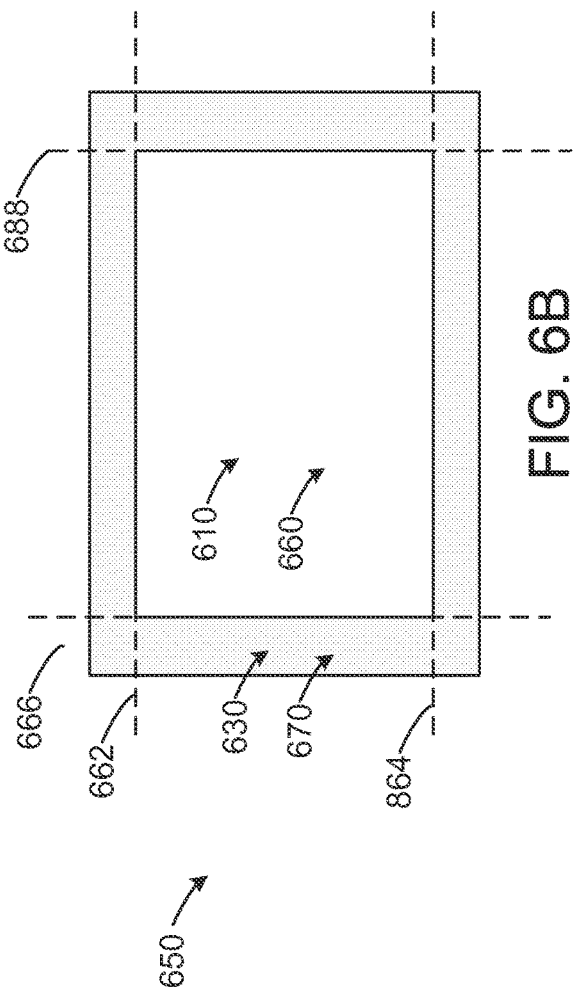

TARGETED CONTENT DISTRIBUTION OVER A NETWORK

CROSS-REFERENCE TO RELATED APPLICATIONS

This application is a U.S. National Stage application under 35 U.S.C. § 371 of International Application PCT/US2014/063512 (published as WO 2015/066519), filed Oct. 31, 2014, which claims priority to U.S. Application 61/898,262, filed Oct. 31, 2013. Benefit of the filing date of each of these priority applications is hereby claimed. Each of these prior applications is hereby incorporated by reference in its entirety.

BACKGROUND

Many users today subscribe to video service providers, such as Comcast, and their subscription entitles them to view programming offered by various content sources such as ESPN (Entertainment & Sports Network), HBO (Home Box Office), etc. Many of those content sources also offer their programs via their own Internet page. When a user accesses the content source's Internet page to request to view a program (e.g., accessing the ESPN website to request to watch a football game), that content source may first ask the user to verify that he/she is indeed a video service provider subscriber who is entitled to watch ESPN. The content source website may direct the user to log in to a website for their video service provider. When the user's credentials are confirmed by the video service provider, the video service provider may provide a notification to the content source website, and the content source website may then stream the video program to the user's Internet browser. For privacy and competitive reasons, the user's video service provider login credentials are not provided to the content source website.

During such streaming, there are occasionally opportunities for the inclusion of secondary content (e.g., commercials), and the content source website may insert the secondary content in the stream sent to the user. In some arrangements, the content source website may give the video service provider an opportunity to identify the secondary content, such as a commercial, to be presented to the user. However, this request does not identify information associated with the user, since the content source website did not receive the user's service provider login credentials. Since the video service provider is not given personal details of the user, the video service provider is forced to select a rather generic piece of secondary content to present to the user. There remains a need to allow the video service provider in this instance to obtain more details about the user, and to select the most appropriate secondary content based on the user's demographics, preferences, history, etc., while still preserving the confidentiality and competitive concerns that prevent the content source website and service provider from simply exchanging the user's personal information.

SUMMARY

In some embodiments herein, when a user's browser requests to stream content from a content source website, the content source website may first ask the user's browser to log in to the user's account at a video service provider website. Upon successful login, the video service provider may cause information, such as a cookie identifying information associated with the user, content source and desired content, to be stored by the user's browser. The video service provider website may notify the content source website that the user has successfully logged in, and that the user is permitted to view the content source's content, and in response, the content source website may begin to stream the requested content to the user.

When a commercial break arrives during the content source's presentation of the content, and if it is time for the video service provider to identify the commercial to be shown to the user, the content source website may request an address from the video service provider. In response, the video service provider may return an address of the video service provider's own website server, and when the user's browser accesses the video service provider's website server, the video service provider's website is able to retrieve the previously-stored cookie, and learn information associated with the user, such as advertising preference information, demographic information, viewing history information and the like. With this information known, the video service provider may determine the most appropriate secondary content for the user (e.g., based on the user's account preferences, demographics, etc.), and may direct the user's browser to the address where that secondary content may be found. At the conclusion of the commercial break, the user's browser may return to the content source website, and inform it that the user is ready to resume viewing the content source's program.

Some embodiments may involve authorizing, by a computing device, a first content source to provide primary content to a user device; receiving, by the computing device, a request from the first content source to identify a location of secondary content to be presented to the user device; responding, by the computing device, to the request by providing an address to the first content source; receiving, at the address, a request for the secondary content from the user device; responding to the request for the secondary content from the user device by: retrieving information associated with the user from the user device; using the information to generate at least one parameter for selecting the secondary content; and sending a response to the user device, wherein the response comprises an address for the secondary content and the at least one parameter for selecting the secondary content.

In some embodiments, the authorizing may entail identifying, by the computing device, information associated with a user of the user device; determining, by the computing device, one or more characteristics associated with the user, the one or more characteristics corresponding to a feature of the secondary content; and communicating, by the computing device, the information associated with the user to the user device, the information including the one or more characteristics.

The method may further entail receiving, by the computing device, a request from the first content source to verify that a user associated with the user device is a subscriber to services provided by a service provider; determining, by the computing device, one or more characteristics corresponding to one or more services subscribed by the user, the one or more characteristics also corresponding to a feature of the secondary content; and communicating, by the computing device, the information associated with the user to the user device, the information including the one or more characteristics.

In some embodiments, a user's viewing history information may be used in selecting the secondary content. The user's demographic and geographic information may also be used for this purpose, and this information may be stored in a data file, such as a browser cookie, on a device of the user. The method may further comprise storing at least a portion of the information associated with the user at a memory location locally accessible to the first computing device; and including a reference to the memory location as part of the information communicated to the user device, wherein generating the at least one customization parameter is based, at least in part, on the information locally accessible to the first computing device accessed by using the reference retrieved from the user device.

In some embodiments, the method may comprise creating, by the computing device, a redirection instruction to redirect the request for secondary content to a second content server, the redirection instruction may include information associated with the user and including the at least one parameter, and creating a redirection instruction comprises creating an HTTP 302 redirection instruction.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

FIG. 5 illustrates an example signaling flow for delivering secondary content.

FIGS. 6a&b illustrate a timeline and screen for display of primary and secondary content.

DETAILED DESCRIPTION

Figure 1:
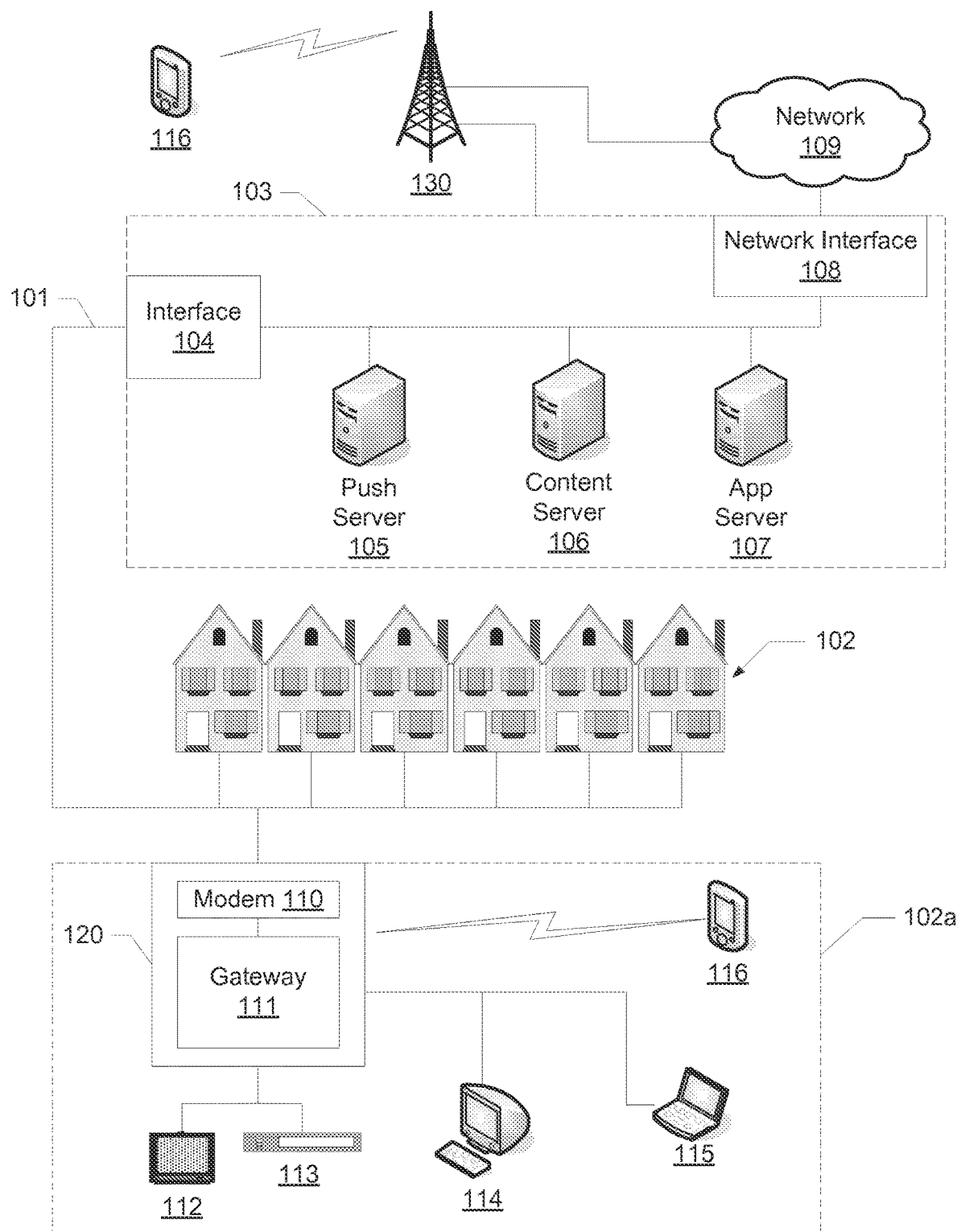
FIG. 1 illustrates an illustrative network environment.

FIG. 1 illustrates an example information distribution network 100 in which many of the various features described herein may be implemented. The illustrated information distribution network is only one example of a suitable network and is not intended to suggest any limitation as to the scope of use or functionality of the disclosure. The illustrated network should not be interpreted as having any dependency or requirement relating to any component or combination of components in an information distribution.

Network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other suitable type of information distribution network or combination of networks. For example, network 100 may be a cellular broadband network communicating with multiple communications access points, such as wireless communications tower 130. In another example, network 100 may be a coaxial system comprising a cable modem termination system (CMTS) communicating with numerous gateway interface devices (e.g., gateway interface device 111 in example home 102a). In another example, the network 100 may be a fiber-optic service system comprising optical fibers extending from an optical line terminal (OLT) to numerous optical network terminals (ONTs) communicatively coupled with various gateway interface devices. In another example, the network 100 may be a digital subscriber line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other suitable network architectures now known or later developed.

Network 100 may use a series of interconnected communication links 101 (e.g., coaxial cables, optical fibers, wireless links, etc.) to connect premises 102 (such as homes) or other user environments to local office 103. Communication links 101 may include any suitable wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other suitable components for communicating data. Data may include, for example, internet data, voice data, weather data, content data, and any other suitable information. Content data may include, for example, video content, audio content, media on demand, video on demand, streaming video, television programs, text listings, graphics, advertisements, and other content. A content item may represent an individual piece of content, such as a media content item (e.g., a particular movie, television episode, online video clip, song, audio recording, image, or other media content) or any other data. In some instances, a content item may be fragmented into segments, such as a plurality of two-second video fragments that may be separately addressed and retrieved.

Local office 103 may transmit downstream information signals onto communication links 101, and premises 102 may receive and process those signals. In certain implementations, communication links 101 may originate from local office 103 as a single communications path, and may be split into any suitable number of communication links to distribute data to homes 102 and various other destinations. Although the term home is used by way of example, homes 102 may include any type of user environment, such as single family homes, apartment complexes, businesses, schools, hospitals, parks, and other suitable environments and combinations of environments.

Local office 103 may include interface 104, which may be a computing device configured to manage communications between devices on the network of communication links 101 and backend devices, such as server 105, server 106, and server 107. For example, interface 104 may be a cable modem termination system (CMTS). The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in premises 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol networks, cellular communications networks (e.g., Global System for Mobile Communications (GSM), Code Division Multiple Access (CDMA), and any other suitable 2nd, 3rd, 4th and higher generation cellular communications networks), cellular broadband networks, radio access networks, fiber-optic networks, local wireless networks (e.g., Wi-Fi, WiMAX), satellite networks, and any other suitable networks or combinations of networks.

Local office 103 may include a variety of servers that may be configured to perform various functions. Local office 103 may include one or more push servers 105 for generating push notifications to deliver data, instructions, or both to devices that are configured to detect such notifications. For example, push server 105 may transmit an instruction to a device to transfer service from one wireless network or communications access point to another wireless network or communications access point. Local office 103 may include one or more content servers 106 configured to provide content (e.g., media content) to devices. Local office 103 may include one or more application servers 107. For example, application server 107 may be used to implement a caching device, such as a cache server, for the content stored in or provided by content server 106.

Premises 102 may comprise a single family home, an apartment, an outdoor restaurant, an office suite, or any other suitable indoor environment and extend to an outdoor environment. Example home 102*a* may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other suitable device or combination of devices. In certain implementations, device 110 may be a part of, or communicatively coupled to, gateway interface device 111. Gateway 111 may be, for example, a wireless router, a set-top box, a computer server, or any other suitable computing device or combination.

Gateway interface device 111 may be any suitable computing device for communicating with device 110 to allow one or more other devices in example home 102*a* to communicate with local office 103, one or more external networks 109, or other devices communicatively coupled thereto. Gateway 111 may include local network interfaces to provide communication signals to user devices in or near example home 102*a*, such as television 112, set-top box 113, personal computer 114, laptop computer 115, wireless device 116 (e.g., a wireless laptop, a tablet computer, a mobile phone, a portable gaming device), vehicular computing system 117 (e.g., a mobile computing system, navigation system, or entertainment system in an automobile, marine vessel, or aircraft) and any other suitable device.

Figure 2:
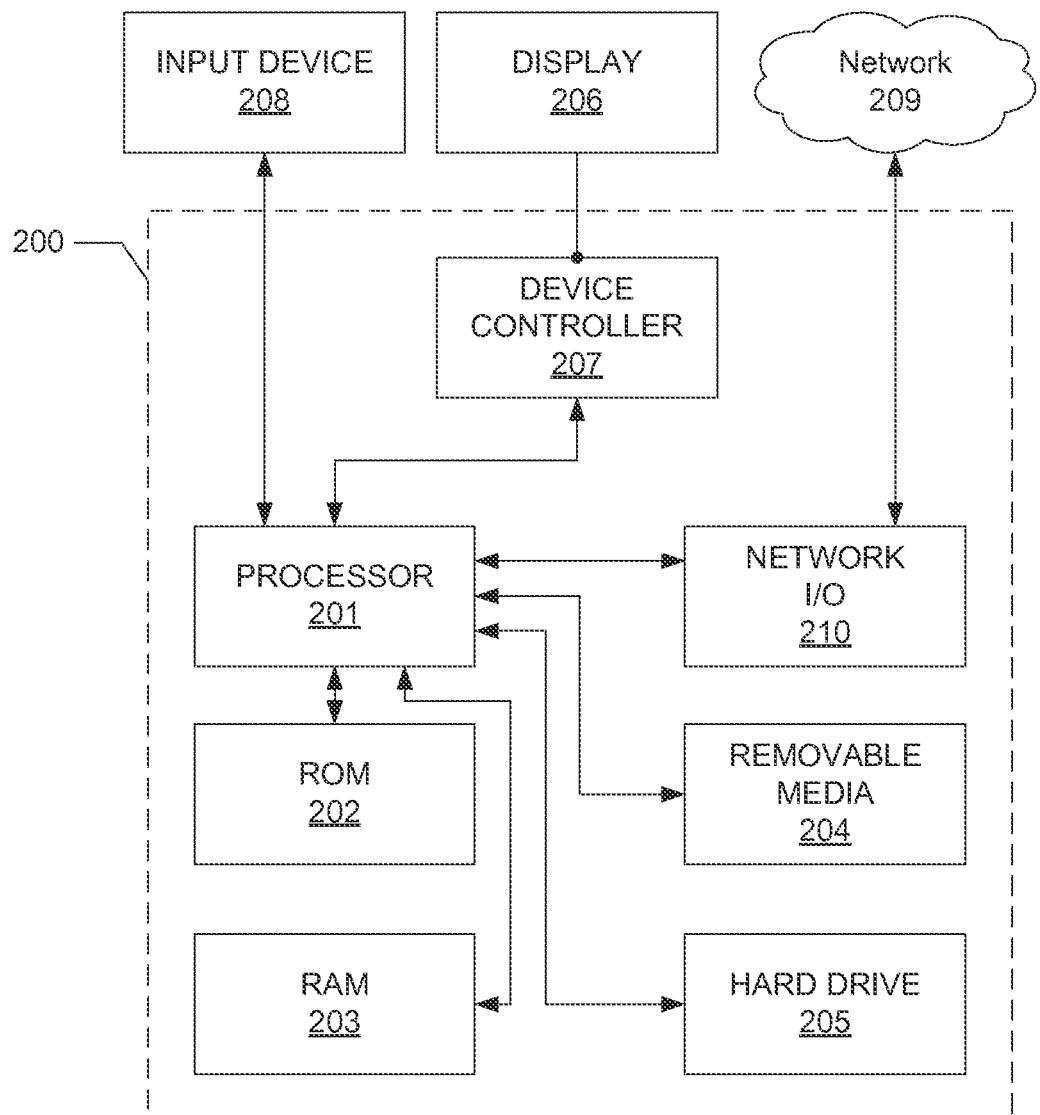
FIG. 2 shows an illustrative software and hardware device on which various elements described herein can be implemented.

FIG. 2 illustrates general hardware elements and software elements that can be used to implement any of the various computing devices and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

Device 200 may include one or more output devices, such as a display 206, such as an external monitor or television, and may include one or more output device controllers 207, such as a video processor. In some embodiments, device 200 may include one or more user input devices 208, such as a remote control, keyboard, mouse, touch screen, microphone, or any other suitable input device.

Device 200 may also include one or more network interfaces, such as network input/output (I/O) interface 210 to communicate with an external network 209. The network interface may be a wired interface, wireless interface, or a combination of the two. In some embodiments, network I/O interface 210 may include a cable modem, and network 209 may include the communication links 101 shown in FIG. 1, one or more external networks 109, an in-home network, a provider's wireless, coaxial, fiber, or hybrid fiber/coaxial distribution system (e.g., a DOCSIS network), or any other desired network.

Figure 3:
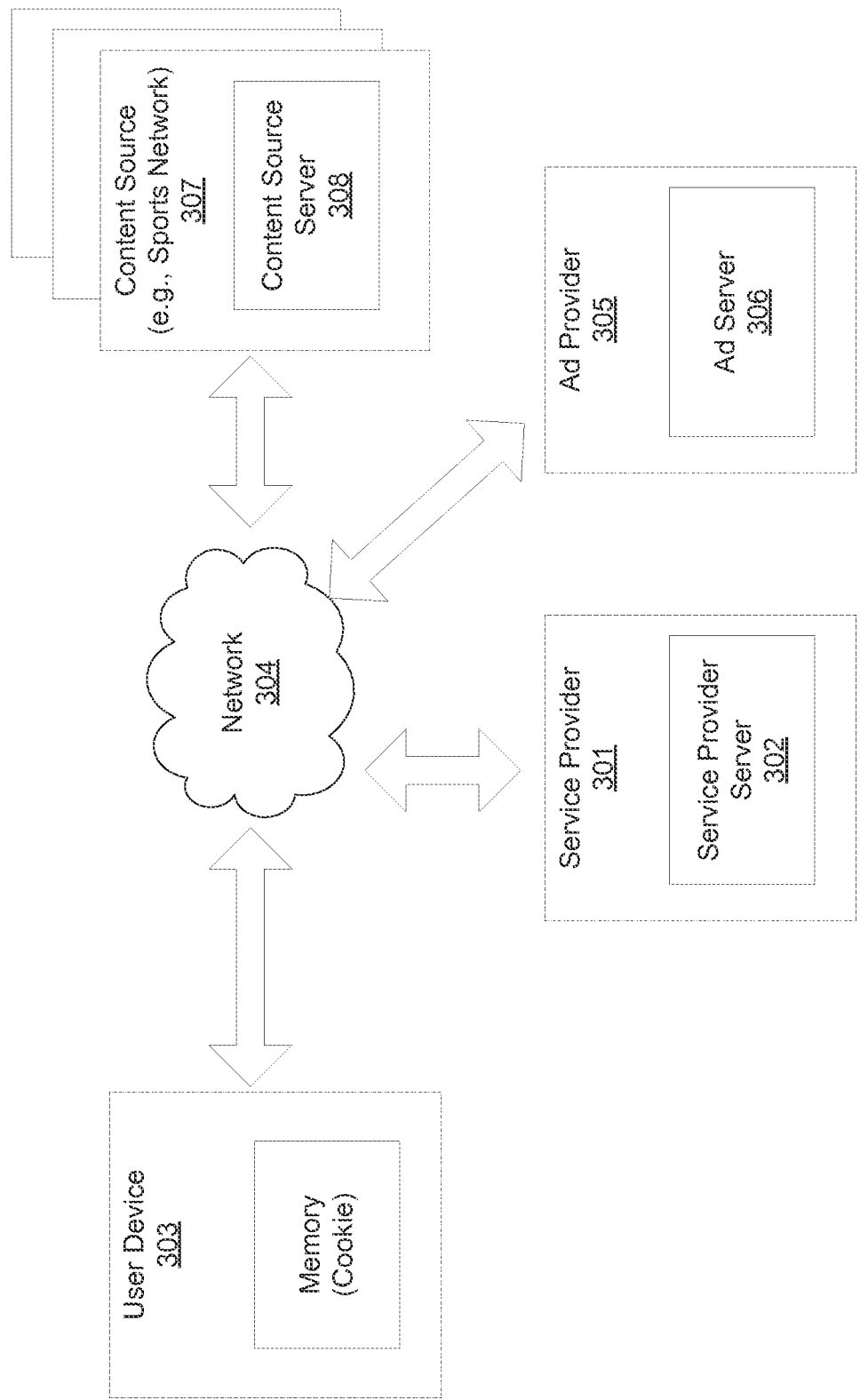
FIG. 3 shows an illustrative content delivery system.

FIG. 3 illustrates an example content delivery system 300 on which features described herein may be used. The system 300 may include a service provider 301. The service provider 301 may be, for example, a subscription service that allows users to view content from various content sources. For example, the service provider 301 may be a cable television service provider, which may allow users to tune to and view content from various content sources, such as video programming from HBO, ESPN, Showtime, etc. Service provider 301 may offer services on different media, such as via coaxial cable, fiber optic cable, wireless cellular signal, satellite, or any other desired media for transmitting content signals, and the content may be received by a user computing device, such as a set-top box 113.

The service provider 301 may include one or more website servers 302. The website server 302 may be implemented using the computing device shown in FIG. 2, and may be configured to offer one or more web pages that the service provider's subscribers may use to access their accounts and obtain content to which they have subscribed. To access the service provider's website server 302, the user may use a device 303, which may be any computing device (e.g., computer 114) that can communicate over a network 304 to reach the service provider's server 302. The user device 303 may also be implemented using the computing device elements shown in FIG. 2, and notably, the device may include internal memory that stores information associated with the user. This information may be, for example, an account identifier, name, or other data that can help the service provider server 302 identify information associated with the user. In some embodiments, the information may be stored as a file or HTTP cookie by a browser application running on the user device 303.

The service provider 301 may also be associated with an advertisement provider 305. The advertisement provider 305 may have a server 306 computing device that is configured to maintain a plurality of different video, audio, and/or audiovisual advertisements, along with criteria for determining which of the advertisements should be supplied to a requesting user. A user's browser may make a request to the ad server 306, and based on one or more parameters contained in the request, the ad server 306 may select a suitable advertisement and supply it to the requesting browser.

The user's subscription with the service provider 301 allows the user to view content from the various content sources using the mechanism(s) authorized by the service provider. For example, the service provider may allow, and even provide, a set-top box 113, computer 114, or any other user device 303 for the user to use to access content. Some content sources, such as a sports network, may also wish to offer their content on their own website, without requiring users to use the mechanism(s) (e.g., a set-top box 113) authorized by the service provider 301. FIG. 3 illustrates content source 307, which may have its own web server 308. As will be explained below, users may also access the content source's website (e.g., the sports network's website via the sports network's website server 308) to request programming from the content source. Example features herein relate to how such a session is authorized, and how commercial breaks may be handled.

Figure 4:
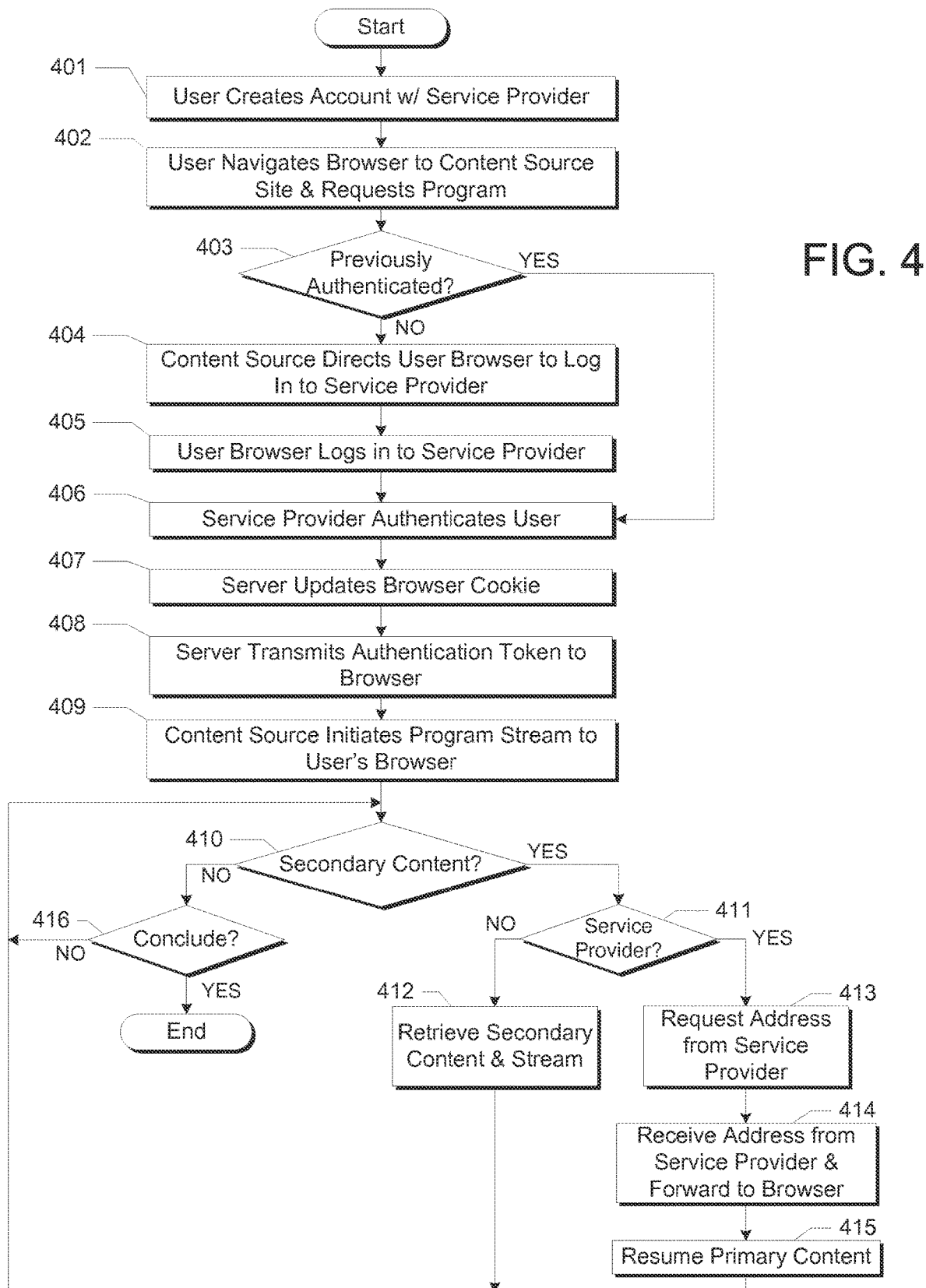
FIG. 4 shows an example process of delivering content.
Figure 1:
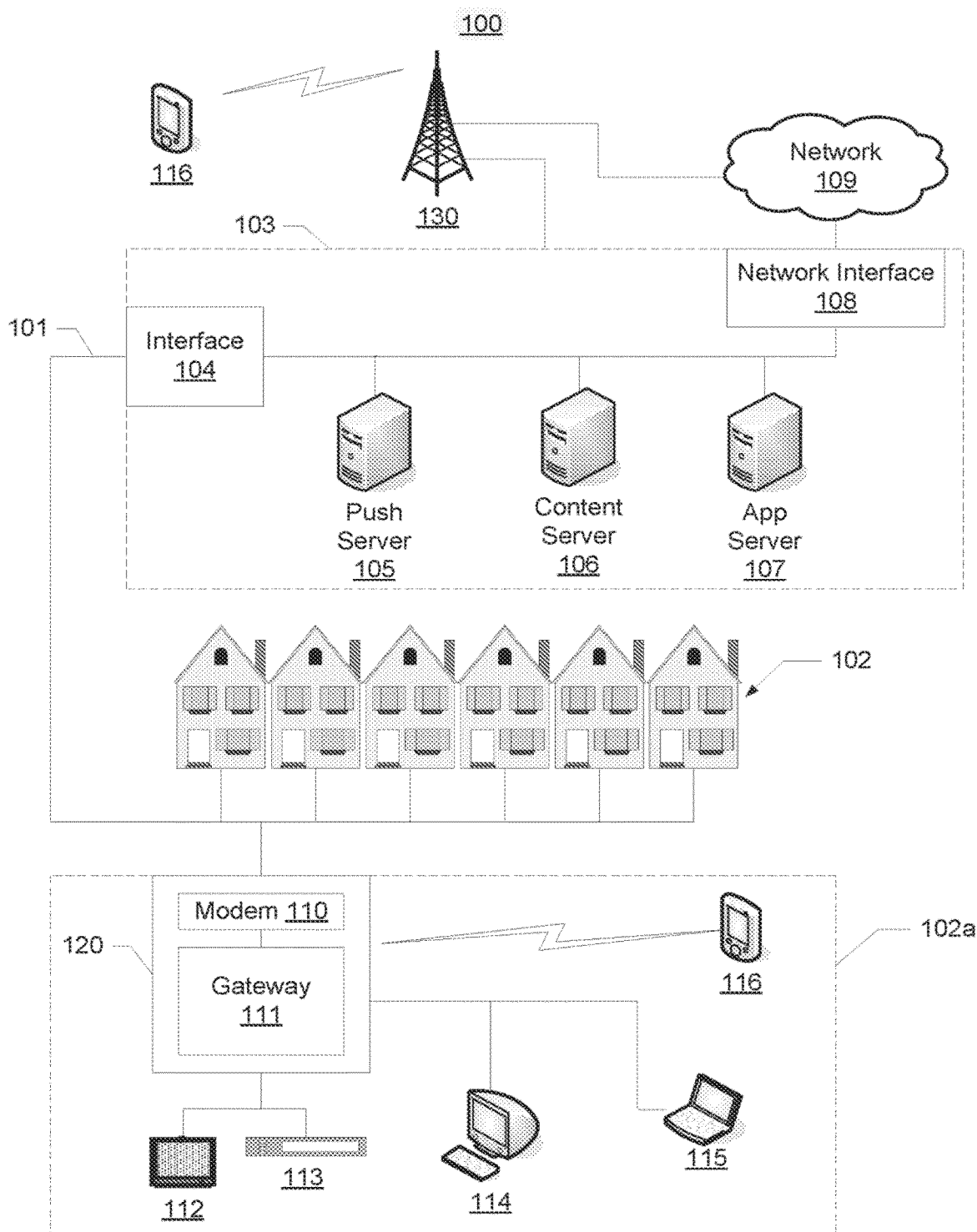
Figure 3:
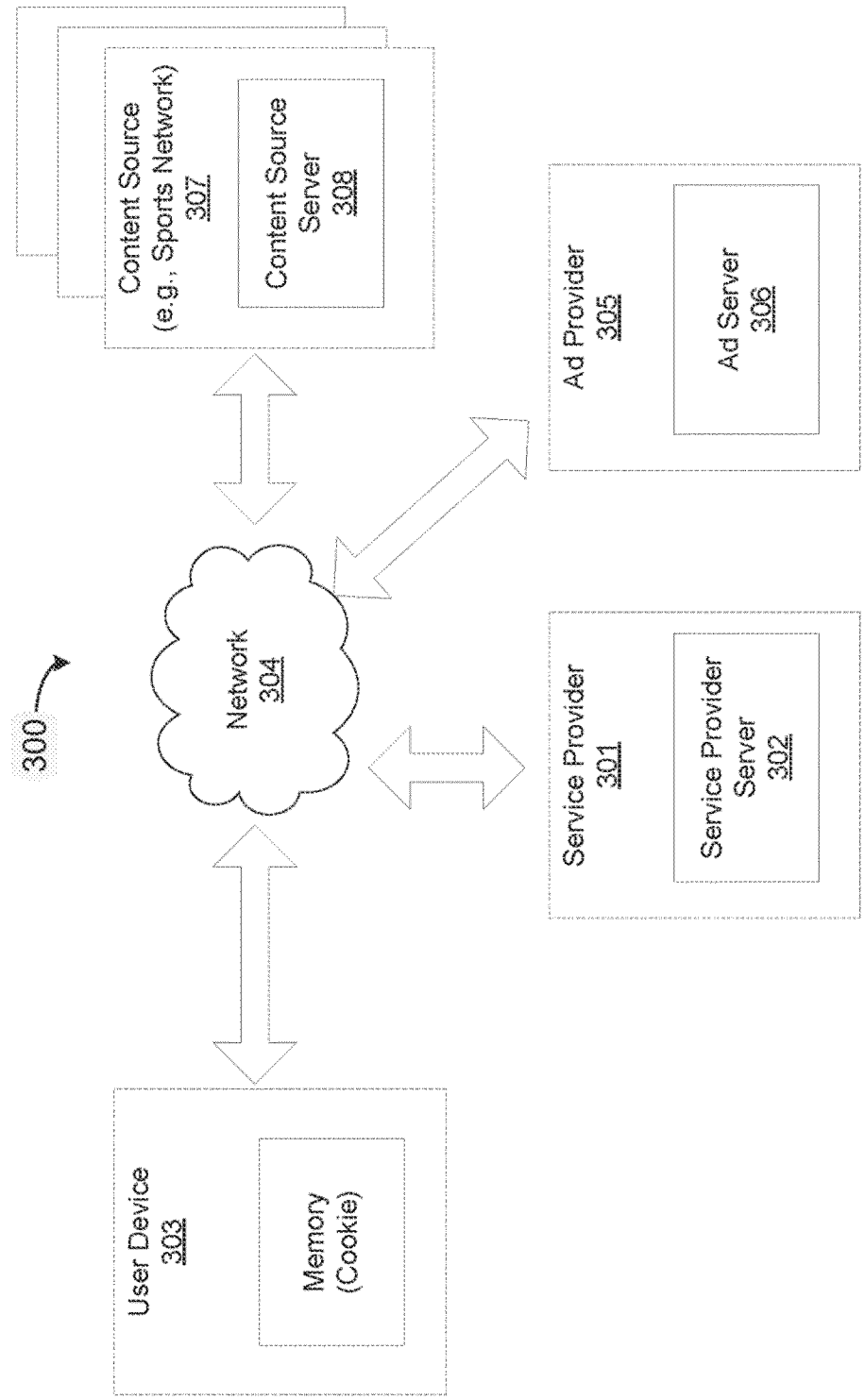

FIG. 4 illustrates an example process by which users may receive programs from a content source's website. The steps illustrated may be performed by one or more computing devices, such as the service provider server 302, user device 303, content source server 306. In step 401, the user may first create an account with the service provider 301. Creating the account may entail determining which services (e.g., video sources, such as HBO, Showtime, ESPN, etc.) the user will be entitled to receive. When creating the account, the user may also create an account on the service provider's website server 302, and may include the user providing various user identification and preference information (e.g., user name, address, household demographics, preferred types of services or content, etc.).

In step 402, the user may eventually use a user computing device 303 (e.g., computer 114) to access a website server 306 of a content source to watch a program, such as a football game, online over the Internet instead of using the television 112 and set-top box 113. This may occur, for example, as the user opens an Internet browser and navigates to a sports network's web site and requests to watch a football game via an Internet stream.

In step 403, the sports network's web site may direct the user's browser to log in to the user's service provider website. This may be done, for example, by asking the user to indicate which service provider they subscribe to, and redirecting the user's web browser to the service provider's site. In this redirection, the content source website may provide session identification information to the user's browser, and ask the browser to supply this session identification information to the service provider's website. The session identification information may include, for example, an identification of the content source and an identification of the program that the user is requesting to see. For security, this information may be encrypted by the content source in a manner that the service provider server is able to decrypt.

In step 404, the user's browser may respond by sending a request to the service provider's web site, supplying the session identification information, and supplying the user's login credentials for the service provider's web site. These credentials may be, for example, a user identifier and a password established during account creation 401.

In step 405, the service provider website server 302 may authenticate the user's credentials, and determine whether the user is permitted to access the requested program (e.g., determine whether the user's subscription package includes the sports network carrying the requested football game).

In step 406, the service provider website server 302 may request to store (or update) website information at the user's computing device 303. Such information can be a browser cookie, and can include information associated with the user (e.g., the user's login identifier for the service provider's website), identifying other information associated with the user such as demographic information, preferences (e.g., advertising preferences, viewing preferences, etc.), viewing history, or other factors. In some embodiments, the cookie may be updated to include an identification of the program that the user is viewing, an identification of the content source supplying the program, and details of the viewing session (e.g., playback progress in the program, display resolution of images, audio channel number and language, playback speed, etc.). In some cases, the cookie may not be updated with information associated with the user. For example, the user may not specify any information to be included in the cookie.

In step 407, the service provider website server 302 may transmit an authentication token to the user's browser. The token may contain information indicating that the service provider has authorized the user for receiving the requested program. The token may be encrypted for security, and may include an identifier of the session identification information that was originally received from the browser in step 404.

In step 408, the user's browser may provide the authentication token to the content source website server 306, and in response, the server 306 may begin to transmit the requested program to the user's browser.

In step 409, the content source may determine whether it is time for the user to receive secondary content. This may occur, for example, when a commercial break is encountered during the presentation of a football game, and the content source needs to determine which commercial to show to the user.

If it is time for the user to receive secondary content, then in step 410, the content source may determine who should supply that secondary content. For example, the content source and service provider may have an agreement to share the commercial breaks (e.g., taking turns supplying commercials), and the content source may need to determine whose turn it is to supply a commercial for the user.

If the content source determines that it, the content source, is supposed to provide the secondary content, then in step 411, the content source can simply retrieve the secondary content (e.g., retrieving the audiovisual file for a commercial) and insert it into the video stream being used to deliver the primary content to the user. Alternatively, the content source can retrieve an address (e.g., an Internet address) where the secondary content is located, and direct the user's browser to go to that address and retrieve the secondary content for display.

If, in step 410, the content source determines that the service provider (or any other entity) is supposed to supply the secondary content, then in step 412, the content source may transmit a request to the service provider server 302, requesting an address (e.g., an Internet address) where the secondary content may be obtained. Additional details regarding the process by which the service provider responds to this request are found below with regard to FIG. 5.

In step 413, the content source receives the address of the secondary content that the service provider has selected, and forwards the address to the user's browser. When the browser has accessed the secondary content, and has completed presenting it to the user, the browser can notify the content source of the completion. Then, in step 414, the content source may resume streaming of the primary content, and the process may return to step 409 to await the next commercial break.

In step 409, if it is determined that it is not time for a commercial break, then in step 415, the content source may determine whether the streaming session should conclude. Concluding the streaming session can be needed, for example, if the user navigates his/her browser away from the content source's server address, or if the user requests to stop viewing the program (e.g., by selecting a "Stop" option while viewing a football game, or requesting to view a different game)

FIG. 5 illustrates an example signal and processing flow that may occur after step 412, when the content source requests an address for secondary content to be provided to the user. In step 501, and as discussed above regarding step 412, the content source may transmit an advertising request to the service provider's server 302. The request may contain information identifying the content source 306, the primary program that the user is viewing (e.g., identifying the football game), and any other desired information.

In step 502, the server 302 may return an address to the content source. This returned address, however, may simply identify the service provider server 302 itself, and might not actually be the address of the secondary content. Nevertheless, the content source 306 may be unaware of this fact, and may simply forward the address to the user's browser in step 503. This signal 503 may also include a command instructing the browser to navigate to the returned address.

In step 504, the user's browser may receive the returned address, and may navigate to the returned address. As noted above, the returned address may simply be the address of the service provider server 302 itself. In response to the user's browser accessing the service provider's server 302, the service provider may request 505 that the browser supplies a cookie, or any other information, that the browser has previously stored for the service provider. This information may be the information that was stored in step 406 described above.

In step 506, the browser responds by supplying the requested cookie, and in step 507, the service provider 302 may examine the cookie to extract the information associated with the user contained therein. The user information may identify demographics of the user (e.g., age, gender, household income, neighborhood home value, geographic address or location, marital status, etc.), and may also (or alternatively) identify preferences of the user (e.g., no alcoholic advertisements, no toy advertisements, etc.), viewing history, and/or other information regarding the user. Alternatively, the cookie may simply contain a simple identifier associated with the user (e.g., an account number), and the service provider 302 may store a database containing the various demographic and preference information for the service provider's account holders, which may be accessible using the identifier. In some cases, the cookie may include a generic identification parameter, such as in cases when information associated with the user has not been referenced in the cookie. In such cases, the cookie may include a generic parameter (e.g., a general advertising preference parameter) not associated with a user. This generic parameter may be used in place of the information associated with the user, such as when a user opts out of providing preference and/or demographic information. In such cases, the generic parameter may be used to specify which secondary content to be provided to the user device.

As part of the extraction, the service provider may also determine what information additional parameters should be provided to the ad provider 306 to allow the ad provider 306 to select an appropriate advertisement for the user. This determination may be based on the degree of customization offered by the ad provider 306, and the information that the ad provider will use. For example, different ad providers may have different parameters, data formats and fields for requesting an advertisement and identifying parameters that the ad provider can use to select an appropriate advertisement. In addition to information regarding the user, the ad provider 306 may also use information regarding the user's session to select the most appropriate advertisement. The information regarding the user's session may include, for example, information identifying the type of user device 303 being used for the session, the video program that the user is watching in the session, the time position within the program (e.g., the user has watched the first half of the football game), the user's playback settings on the device 303 or with the content source 306 (e.g., volume settings, number of audio channels delivered, image resolution), and any other piece of information that the ad server 306 is configured to use when selecting an advertisement.

After the service provider server 302 has identified information associated with the user from the cookie, and determined the parameters to be provided to the ad provider, the server 302 may respond to the user's browser in step 508, and supply the browser with an address of the ad server 306. This response may also include one or more parameters that the browser should provide when requesting content form the address of the ad server 306. In some embodiments, this response may take the form of an HTTP 302 redirect message, telling the user's browser to try a different address in response to the browser's request in step 504. The added parameters may simply be appended to the end of the uniform resource locator (URL) containing the address of the ad server 306.

In step 509 the browser may, in response, transmit a request to the address of the ad server 306. The request may include a request for advertisement content, and may include the parameters that were supplied by the service provider in step 508. The ad server may use the parameters in step 510 to select the appropriate advertisement for the user, and may provide the advertisement to the user in step 511. When the advertisement has been completely played by the ad provider (or completely displayed at the browser), the ad server 306 may instruct the browser to inform the content source that the advertisement (the secondary content) has completed, and the process may resume with step 414 discussed above.

FIG. 6a illustrates a timing diagram 600 representative of different content (e.g., first content 610, second content 620 and/or third content 630) at the user device. For example, the user device may receive the first content 610 (e.g., primary content) from the content source 306. For example, the first content 610 may be a sporting event, a movie, a television program, an audio program, gaming content, and/or the like that may be provided by the content source. In some cases, the content source 306 may provide second content 620 (e.g., advertising content) during one or more durations 615, 617 included in the session in which the first content 610 is presented to the user device. In some cases, the service provider 301 may provide third content 630 during a portion of session, such as in response to a request for content as described above in reference to FIGS. 4-5. In some cases, the third content 630 may be requested and/or provided during the durations 615, 617 common to the presentation of the second content 620. In some cases, the third content may be presented during a different duration within the session, such as duration 633 at the beginning or end of the session.

FIG. 6b illustrates a user interface screen 650 that may be displayed at the user device 303 for displaying any combination of the first content 610, the second content 620, and/or the third content 630. In some cases, the whole of the user interface screen 650 may be used to display the different content, such as for serially presented content. For example, the first content 610 may be presented within the whole of the user interface screen 650. When the second content 620 and/or third content 630 is presented at the user device, the first content 610 may be paused such as during the durations 615, 617, 633. While paused, one or both of the second content 620 and the third content 630 may be presented using the whole of the user interface screen 650.

In some cases, however, one or both of the second content 620 and the third content 630 may be presented concurrently with the presentation of the first content 610. For example, a commercial may be displayed as an overlay atop the video image of a football game.

The various features described above are merely non-limiting examples, and can be rearranged, combined, subdivided, omitted, and/or altered in any desired manner. For example, features of the servers can be subdivided among multiple processors and computing devices. The described example computing devices, servers and functions can be implemented individually on different devices, or they may be combined into a single device.

In at least some embodiments, each of the servers and computing devices described above may be implemented as multiple servers or devices for redundancy and/or to increase the amount of analysis, data storage and other services being performed, in some cases simultaneously. For example, the content source server 308 and/or the service provider server 302 may include one or more hardware interfaces that provide physical connections by which the server communicates with other servers in the content delivery system 300 and/or with other elements of the network 304. In at least some embodiments, the servers may include hardware interfaces that may include one or more Ethernet cards. The servers may further include a memory for storing instructions and data and a processor for executing instructions and controlling operation of the server. Memory and/or computational operations of the servers may be respectively distributed across multiple memory devices and/or multiple processors located within the server and/or across memory and processors located on multiple platforms. In some cases, the memory may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. The processor may be implemented with any of numerous types of devices, including but not limited to one or more general purpose microprocessors, one or more application specific integrated circuits, one or more field programmable gate arrays, and combinations thereof. In at least some embodiments, the processor may process operations described herein according to machine readable instructions stored in the memory and/or stored as hardwired logic gates within the processor. In some cases, the processor may communicate with and/or control the memory and interface devices over one or more buses.

Further, the example embodiments above refer to viewing a video program (e.g., a football game) in which advertisements appear as the secondary content. These are just examples. The primary and secondary content may be any desired type of audio, video, or audiovisual content.

The examples above refer to the use of cookies to store information associated with the user for the service provider server 302. The information need not be a cookie, and may instead be any desired type of file that can be used by whatever application is running on the user device 303 to access the service provider's website. The application may be dedicated to a particular content source (e.g., an application for the sports network), in contrast to a general Internet browser that can access any desired Internet address, and the information stored on the user device 303 may be any file that is accessible to that application.

Other variations to the embodiments described may also be made, and the true scope of this patent should only be defined by the claims that follow.

What is claimed is:

1. A method comprising:
   authorizing, by a computing device, a content source to provide primary content to a user device;
   receiving, by the computing device and from the content source, a request for a location of secondary content to be presented to the user device;
   responding, by the computing device and to the request, by providing the content source with an address, of the computing device, to be delivered to the user device;
   receiving, by the computing device and from the user device, a request for the secondary content;
   responding to the request for the secondary content by:
      retrieving, from the user device, information associated with a user;
      generating, using the information associated with the user, at least one parameter for selecting the secondary content; and
      sending, to the user device, a response, wherein the response comprises:
         an address of the secondary content, and
         the at least one parameter for selecting the secondary content.

2. The method of claim 1, wherein the authorizing comprises:
   determining, by the computing device, one or more characteristics associated with the user, wherein the one or more characteristics correspond to a feature of the secondary content;
   determining, by the computing device and based on the one or more characteristics, the information associated with the user; and
   communicating, by the computing device and to the user device, the information associated with the user.

3. The method of claim 1, further comprising:
   receiving, by the computing device and from the content source, a request to verify that the user is a subscriber to services provided by a service provider;
   determining, by the computing device, one or more characteristics that:
      correspond to one or more services subscribed to by the user, and
      correspond to a feature of the secondary content; and
   communicating, by the computing device and to the user device, the information associated with the user, wherein the information comprises the one or more characteristics.

4. The method of claim 1, further comprising:
   receiving, by the computing device and from the content source, a request to verify that the user is a subscriber to services provided by a service provider;
   determining, by the computing device, one or more characteristics that:
      correspond to one or more services subscribed to by the user, and
      correspond to a feature of the secondary content; and communicating, by the computing device and to the user device, the information associated with the user, wherein the information comprises the one or more characteristics;

storing a viewing history of the user; and generating the at least one parameter, for selecting the secondary content, based on the viewing history of the user.

5. The method of claim 1, further comprising:

storing, by the computing device, the information associated with the user, wherein the information comprises one or more of geographic information or demographic information.

6. The method of claim 1, wherein the retrieving the information associated with the user comprises retrieving the information from a browser cookie.

7. The method of claim 1, further comprising:

based on the information associated with the user, retrieving, from a memory location accessible to the computing device, additional information associated with the user; and wherein the generating the at least one parameter for selecting the secondary content comprises generating the at least one parameter using the information and the additional information.

8. The method of claim 1, further comprising:

based on the information associated with the user, retrieving, from a memory location accessible to the computing device, additional information associated with the user;

causing, by the computing device, storage at the user device of the additional information associated with the user; and causing storage at the user device of information associated with a client browser operating on the user device, wherein the generating the at least one parameter for selecting the secondary content comprises generating the at least one parameter using the information and the additional information.

9. The method of claim 1, further comprising:

creating, by the computing device, a redirection instruction to redirect the request for the secondary content to a content server, wherein the redirection instruction comprises the information associated with the user and comprises the at least one parameter.

10. The method of claim 1, further comprising:

creating, by the computing device, a hypertext transfer protocol (HTTP) redirection instruction to redirect the request for the secondary content to a content server, wherein the HTTP redirection instruction comprises the information associated with the user and comprises the at least one parameter.

11. The method of claim 1, wherein the receiving the request for the location of the secondary content comprises receiving the request for the location of the secondary content during a break in providing primary content to the user device.

12. The method of claim 1, wherein the receiving the request for the location of the secondary content comprises receiving the request for the location of the secondary content after a temporary pause in providing primary content to the user device prior to concluding the providing of the primary content.

13. A method comprising:

authorizing, by a computing device, a content source to provide primary content to a user device;

receiving, by the computing device and from the content source, a request associated with the user device;

responding, by the computing device and to the request, by providing the content source with a first address, of the computing device, to be delivered to the user device;

receiving, by the computing device and from the user device accessing the first address, a request for secondary content;

responding to the request for secondary content by:

retrieving, from the user device, information associated with a user;

generating, using the information associated with the user, at least one parameter for selecting the secondary content; and sending, to the user device, a response, wherein the response comprises:

a second address of the secondary content, and the at least one parameter for selecting the secondary content.

14. The method of claim 13, wherein the authorizing the content source to provide primary content to the user device comprises:

requesting, by the computing device, user authorization information from the user device; and based on a valid authorization, sending, by the computing device, the information associated with the user to be stored at the user device and accessible by the computing device.

15. The method of claim 13, wherein the sending the response to the user device comprises sending a redirection command to the user device to redirect the request for secondary content from the first address to the second address.

16. The method of claim 13, wherein the sending the response to the user device comprises sending a redirection command to the user device to redirect the request for secondary content from the first address to the second address, and wherein the redirection command comprises a temporary hypertext transfer protocol (HTTP) redirection instruction.

17. An apparatus comprising:

one or more processors; and memory storing instructions that, when executed by the one or more processors, cause the apparatus to:

authorize a content source to provide primary content to a user device;

receive, from the content source, a request for a location of secondary content to be presented to the user device;

respond, to the request, by providing the content source with an address, of the apparatus, to be delivered to the user device;

receive, from the user device, a request for the secondary content;

respond to the request for the secondary content by:

retrieving, from the user device, information associated with a user;

generating, using the information associated with the user, at least one parameter for selecting the secondary content; and sending, to the user device, a response, wherein the response comprises:

an address of the secondary content, and the at least one parameter for selecting the secondary content.

18. The apparatus of claim 17, wherein the instructions, when executed by the one or more processors, cause the apparatus to authorize the content source to provide primary content to a user device by:
   determining, by the apparatus, one or more characteristics associated with the user, wherein the one or more characteristics correspond to a feature of the secondary content;
   determining, by the apparatus and based on the one or more characteristics, the information associated with the user; and
   communicating, by the apparatus and to the user device, the information associated with the user.

19. The apparatus of claim 17, wherein the instructions, when executed by the one or more processors, further cause the apparatus to:
   receive, from the content source, a request to verify that the user is a subscriber to services provided by a service provider;
   determine one or more characteristics that:
      correspond to one or more services subscribed to by the user, and
      correspond to a feature of the secondary content; and
   communicate, to the user device, the information associated with the user, wherein the information comprises the one or more characteristics.

20. The apparatus of claim 17, wherein the instructions, when executed by the one or more processors, further cause the apparatus to:
   receive, from the content source, a request to verify that the user is a subscriber to services provided by a service provider;
   determine one or more characteristics that:
      correspond to one or more services subscribed to by the user, and
      correspond to a feature of the secondary content;
   communicate, to the user device, the information associated with the user, wherein the information comprises the one or more characteristics;
   store a viewing history of the user; and
   generate the at least one parameter, for selecting the secondary content, based on the viewing history of the user.

21. The apparatus of claim 17, wherein the instructions, when executed by the one or more processors, further cause the apparatus to:
   store the information associated with the user, wherein the information comprises one or more of geographic information or demographic information.

22. The apparatus of claim 17, wherein the instructions, when executed by the one or more processors, cause the apparatus to retrieve the information associated with the user by retrieving the information from a browser cookie.

23. The apparatus of claim 17, wherein the instructions, when executed by the one or more processors, further cause the apparatus to:
   based on the information associated with the user,
   retrieve, from a memory location accessible to the apparatus, additional information associated with the user; and
   wherein the instructions, when executed by the one or more processors, cause the apparatus to generate the at least one parameter for selecting the secondary content by generating the at least one parameter using the information and the additional information.

24. The apparatus of claim 17, wherein the instructions, when executed by the one or more processors, further cause the apparatus to:
   based on the information associated with the user, retrieve, from a memory location accessible to the apparatus, additional information associated with the user;
   cause storage, at the user device, of the additional information associated with the user; and
   cause storage, at the user device, of information associated with a client browser operating on the user device,
   wherein the instructions, when executed by the one or more processors, cause the apparatus to generate the at least one parameter for selecting the secondary content by generating the at least one parameter using the information and the additional information.

25. The apparatus of claim 17, wherein the instructions, when executed by the one or more processors, further cause the apparatus to:
   create a redirection instruction to redirect the request for the secondary content to a content server, wherein the redirection instruction comprises the information associated with the user and comprises the at least one parameter.

26. The apparatus of claim 17, wherein the instructions, when executed by the one or more processors, further cause the apparatus to:
   create a hypertext transfer protocol (HTTP) redirection instruction to redirect the request for the secondary content to a content server, wherein the HTTP redirection instruction comprises the information associated with the user and comprises the at least one parameter.

27. The apparatus of claim 17, wherein the instructions, when executed by the one or more processors, cause the apparatus to receive the request for the location of the secondary content by receiving the request for the location of the secondary content during a break in providing primary content to the user device.

28. The apparatus of claim 17, wherein the instructions, when executed by the one or more processors, cause the apparatus to receive the request for the location of the secondary content by receiving the request for the location of the secondary content after a temporary pause in providing primary content to the user device prior to concluding the providing of the primary content.

29. An apparatus comprising:
   one or more processors; and
   memory storing instructions that, when executed by the one or more processors, cause the apparatus to:
      authorize a content source to provide primary content to a user device;
      receive, from the content source, a request associated with the user device;
      respond, to the request, by providing the content source with a first address, of the apparatus, to be delivered to the user device;
      receive, from the user device accessing the first address, a request for secondary content;
      respond to the request for secondary content by:
         retrieving, from the user device, information associated with a user;
         generating, using the information associated with the user, at least one parameter for selecting the secondary content; and
         sending, to the user device, a response, wherein the response comprises:
            a second address of the secondary content, and the at least one parameter for selecting the secondary content.

30. The apparatus of claim 29, wherein the instructions, when executed by the one or more processors, cause the apparatus to authorize the content source to provide primary content to the user device by:
   requesting user authorization information from the user device; and
   based on a valid authorization, sending the information associated with the user to be stored at the user device and accessible by the apparatus.

31. The apparatus of claim 29, wherein the instructions, when executed by the one or more processors, cause the apparatus to send the response to the user device by sending a redirection command to the user device to redirect the request for secondary content from the first address to the second address.

32. The apparatus of claim 29, wherein the instructions, when executed by the one or more processors, cause the apparatus to send the response to the user device by sending a redirection command to the user device to redirect the request for secondary content from the first address to the second address and wherein the redirection command comprises a temporary hypertext transfer protocol (HTTP) redirection instruction.

* * * * *

UNITED STATES PATENT AND TRADEMARK OFFICE
CERTIFICATE OF CORRECTION

PATENT NO. : 11,294,987 B2
APPLICATION NO. : 15/033789
DATED : April 5, 2022
INVENTOR(S) : Stephen Ziring It is certified that error appears in the above-identified patent and that said Letters Patent is hereby corrected as shown below:

In the Drawings

Fig. 1, Sheet 1 of 6:
Insert --100-- (Delete Drawing Sheet 1 and substitute therefore with the attached Drawing Sheet 1.)

Fig. 3, Sheet 3 of 6:
Insert --300-- (Delete Drawing Sheet 3 and substitute therefore with the attached Drawing Sheet 3.)

In the Specification

Brief Description of the Drawings, Column 3, Line 38:
Delete "6a&$b$" and insert --6A&B--

Detailed Description, Column 7, Line 18:
Delete "306." and insert --308.--

Detailed Description, Column 7, Line 30:
Delete "306." and insert --308.--

Detailed Description, Column 9, Line 5:
After "game)", insert --.--

Detailed Description, Column 10, Line 42:
Delete "6$a$" and insert --6A--

Detailed Description, Column 10, Line 62:
Delete "6$b$" and insert --6B--

Signed and Sealed this
First Day of August, 2023

*Katherine Kelly Vidal*

Katherine Kelly Vidal
*Director of the United States Patent and Trademark Office*